US012693952B2

(12) United States Patent
Zhou et al.

(10) Patent No.: US 12,693,952 B2
(45) Date of Patent: Jul. 28, 2026

(54) METHOD AND SYSTEM FOR IMPROVING KEYBOARD INPUT IN AUTOMATED TESTING

(71) Applicant: MICRO FOCUS LLC, Santa Clara, CA (US)

(72) Inventors: Gaoyang Zhou, Shanghai (CN); ChengZhe Xu, Shanghai (CN); Yuxiang Zhang, Shanghai (CN)

(73) Assignee: Micro Focus LLC, Santa Clara, CA (US)

( * ) Notice: Subject to any disclaimer, the term of this patent is extended or adjusted under 35 U.S.C. 154(b) by 112 days.

(21) Appl. No.: 18/234,821

(22) Filed: Aug. 16, 2023

(65) Prior Publication Data

US 2025/0061032 A1 Feb. 20, 2025

(51) Int. Cl.
| | |
|---|---|
| *G06F 11/00* | (2006.01) |
| *G06F 3/04886* | (2022.01) |
| *G06F 11/26* | (2006.01) |
| *G06F 11/273* | (2006.01) |
| *G06F 11/30* | (2006.01) |
(Continued)

(52) U.S. Cl.
CPC .......... *G06F 11/26* (2013.01); *G06F 3/04886* (2013.01); *G06F 11/2733* (2013.01); *G06F 11/3041* (2013.01); *G06F 11/3668* (2013.01); *G06F 11/3696* (2013.01); *G06F 11/3698* (2025.01)

(58) Field of Classification Search
CPC .. G06F 11/26; G06F 11/2733; G06F 11/3041; G06F 11/3688; G06F 11/3696; G06F 11/3698
See application file for complete search history.

(56) References Cited

U.S. PATENT DOCUMENTS

| | | | | |
|---|---|---|---|---|
| 7,196,691 | B1 * | 3/2007 | Zweig | ................... G06F 3/0233 345/169 |
| 9,720,980 | B2 * | 8/2017 | Thomas | ................ G06F 3/0233 |
| 10,394,343 | B2 * | 8/2019 | Chung | ................... A63F 13/22 |
(Continued)

FOREIGN PATENT DOCUMENTS

| | | | |
|---|---|---|---|
| CN | 101178621 A | | 5/2008 |
| JP | H03246641 A | * | 11/1991 |
| TW | 502199 | | 9/2002 |

OTHER PUBLICATIONS

Sayan Sarcar, Soumalya Ghosh, P. Kumar Saha and Debasis Samanta, "Virtual keyboard design: State of the arts and research issues," 2010 IEEE Students Technology Symposium (TechSym), Kharagpur, India, 2010, pp. 289-299, doi: 10.1109/TECHSYM.2010.5469165 (Year: 2010).*

(Continued)

*Primary Examiner* — Bryce P Bonzo
*Assistant Examiner* — Gabriella Kanani Shelton
(74) *Attorney, Agent, or Firm* — Sheridan Ross P.C.

(57) ABSTRACT

Method and system to improve keyboard input in an automated test environment. The method includes determining a keyboard layout. The method also includes receiving an input, wherein the input comprises a plurality of characters. The method further includes processing the input to determine an input delay between each character of the plurality of characters and entering each character of the plurality of characters with the determined input delay between each character.

20 Claims, 8 Drawing Sheets

(51) Int. Cl.
G06F 11/3668      (2025.01)
G06F 11/3698      (2025.01)

(56) References Cited

U.S. PATENT DOCUMENTS

| | | | |
|---|---|---|---|
| 12,235,853 B1 * | 2/2025 | Tan | G06F 16/29 |
| 2002/0032875 A1 * | 3/2002 | Kashani | G06F 1/1632 |
| | | | 719/310 |
| 2007/0083854 A1 * | 4/2007 | Mayer-Ullmann | G06F 8/73 |
| | | | 717/124 |
| 2011/0214053 A1 * | 9/2011 | Scott | G06F 40/232 |
| | | | 715/764 |
| 2014/0366005 A1 * | 12/2014 | Kozhuharov | G06F 11/3668 |
| | | | 717/125 |
| 2018/0039385 A1 * | 2/2018 | Worley | G06F 3/0482 |
| 2020/0150781 A1 * | 5/2020 | Xu | G06F 11/3457 |
| 2022/0138356 A1 * | 5/2022 | Nadin Pinheiro | G06F 21/316 |
| | | | 726/18 |

OTHER PUBLICATIONS

Stuart K. Card, Thomas P. Moran, and Allen Newell, "The Keystroke-Level Model for User Performance Time with Interactive Systems," ACM, vol. 23, 1980, pp. 396-410 (Year: 1980).*
David Kieras, "A Guide to GOMS Model Usability Evaluation using NGOMSL," University of Michigan, 1996, pp. 1-49 (Year: 1996).*

* cited by examiner

310

312

314

316

318

METHOD AND SYSTEM FOR IMPROVING KEYBOARD INPUT IN AUTOMATED TESTING

FIELD

The disclosure relates generally to improving keyboard input in an automated test environment and particularly to systems and methods for mimicking keystrokes as well as mouse input in automated test environments.

BACKGROUND

In software testing, test automation is the use of software separate from the software being tested to control the execution of tests and the comparison of actual outcomes with predicted outcomes.

SUMMARY

The present disclosure is generally directed to a keyboard model anthropomorphic algorithm that provides improvements to automated test tools (e.g., Unified Functional Testing (UFT) Device Replay). Additionally, the algorithm may be adapted to different keyboard layouts/languages.

These and other needs are addressed by the various embodiments and configurations of the present disclosure. The present disclosure can provide a number of advantages depending on the particular configuration. These and other advantages will be apparent from the disclosure contained herein.

Automated testing is the application of software tools to automate a human-driven manual process of reviewing and validating a software product. In manual testing, a tester may perform operations using a keyboard and/or mouse. For example, the tester may enter a password using a keyboard as part of an authentication process. If the same process is automated, the automated test needs to perform the same authentication (e.g., enter the password).

Unified Functional Testing (UFT) Device Replay is a basic feature designed to mimic keyboard keystrokes as well as mouse input in automated testing. However, with the maturity of Artificial Intelligence (AI) technology and anti-automation technology, it has become possible to recognize the behavior of such non-human operations (e.g., UFT Device Replay).

For example, in a computer game, button A may execute move 1; button B may execute move 2; button A and then button B may execute move 3; button B and then button A may execute move 4. When two buttons are used to execute a move (e.g., A then B or B then A), there should be some delay in entering the keystrokes (e.g., 10 frames or ⅓ of a second) This operation of detecting input gaps (e.g., delays) between keystrokes is introduced into anti-automation mechanisms to determine whether the input is entered by a human user or a non-human user, since a non-human user (e.g., automated test tool) may not have a delay between the keystrokes.

In other words, when a human user is typing, there is a delay between pressing each character. The delay between pressing the same character (e.g., "aa") may be shorter than the delay between pressing different characters (e.g., "ab"). The delay between pressing each character may be correlated with the distance between each character on the keyboard. In other words, there is a shorter delay between characters that are located closer together and a longer delay between characters that are located further from each other.

For example, the characters "d" and "f" are located next to each other on the keyboard, while the characters "a" and "p" are further apart. Therefore, there may be a longer delay between entering the input "ap" compared to entering the input "df." In this manner, a delay may be calculated between each character of an input string. In contrast, when input is entered using test automation, the entire input string is entered simultaneously (e.g., "password"), rather than "p," "a," "s," "s," "w," "o," r," "d."

The concept of the present disclosure may also be applied for inputting shortcuts (e.g., ctrl+v for copy and paste). When a human user enters the shortcut ctrl+v there is a delay between the characters "ctrl" and "v." Using the same example, the mouse may be used to perform a copy and paste operation (e.g., clicking the right mouse button to open the menu bar, clicking the left mouse button to select the copy option, right click for menu, and another left click to select the paste option). With this operation there may be an even longer delay between "keystrokes" that needs to be accounted for.

Another way a human user may differ from an automated test script is that a human user may use the backspace key to correct a wrongly entered character, but an automated test script does not make mistakes. Even if the input needs to be re-entered, the test automation tool will modify the content by replacing it directly as an entire string.

Therefore, the present disclosure improves the character input in an automated test environment, and the present disclosure may be adapted to different languages and platforms.

In some embodiments, improving keyboard input in Uniform Functional Testing (UFT) device replay comprises: determining a keyboard layout; receiving an input, wherein the input comprises a plurality of characters; processing the input to determine an input delay between each character of the plurality of characters; and entering each character of the plurality of characters with the determined input delay between each character.

Another aspect of the present disclosure is to provide a system, where the system includes: a keyboard; a processor; and a memory coupled with and readable by the processor and storing therein a set of instructions which, when executed by the processor, cause the processor to improve keyboard input in Uniform Functional Testing (UFT) device replay by: determining a keyboard layout; receiving an input, wherein the input comprises a plurality of characters; processing the input to determine an input delay between each character of the plurality of characters; and entering each character of the plurality of characters with the determined input delay between each character.

Another aspect of the present disclosure is to provide a tangible non-transitory computer readable storage medium comprising instructions that when executed cause a machine to: determine a keyboard layout; receive an input, wherein the input comprises a plurality of characters; process the input to determine an input delay between each character of the plurality of characters; and enter each character of the plurality of characters with the determined input delay between each character.

In some examples of the system, device, method, and machine-readable medium described herein, wherein the input delay between each character is determined based on a distance between each key associated with each character.

In some examples of the system, device, method, and machine-readable medium described herein, wherein the distance between each key of the determined keyboard layout is measured using concentric circles.

In some examples of the system, device, method, and machine-readable medium described herein, wherein each concentric circle that is between a key and a next key adds additional time to the input delay between those keys.

In some examples of the system, device, method, and machine-readable medium described herein, wherein determining the keyboard layout comprises determining a location of a keyboard and selecting a layout based on the determined location of the keyboard.

In some examples of the system, device, method, and machine-readable medium described herein, wherein the input comprises transformed input, and wherein processing the input to determine the input delay between each character of the plurality of characters comprises processing the input before it is transformed.

In some examples of the system, device, method, and machine-readable medium described herein, wherein the input comprises a copy (ctrl+c) and paste (ctrl+v) operation, and wherein processing the input to determine the input delay between each character of the plurality of characters comprises processing a result of the copy (ctrl+c) and paste (ctrl+v) operation.

In some examples of the system, device, method, and machine-readable medium described herein, wherein an input model is selected based on the determined keyboard layout.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Figure 1:
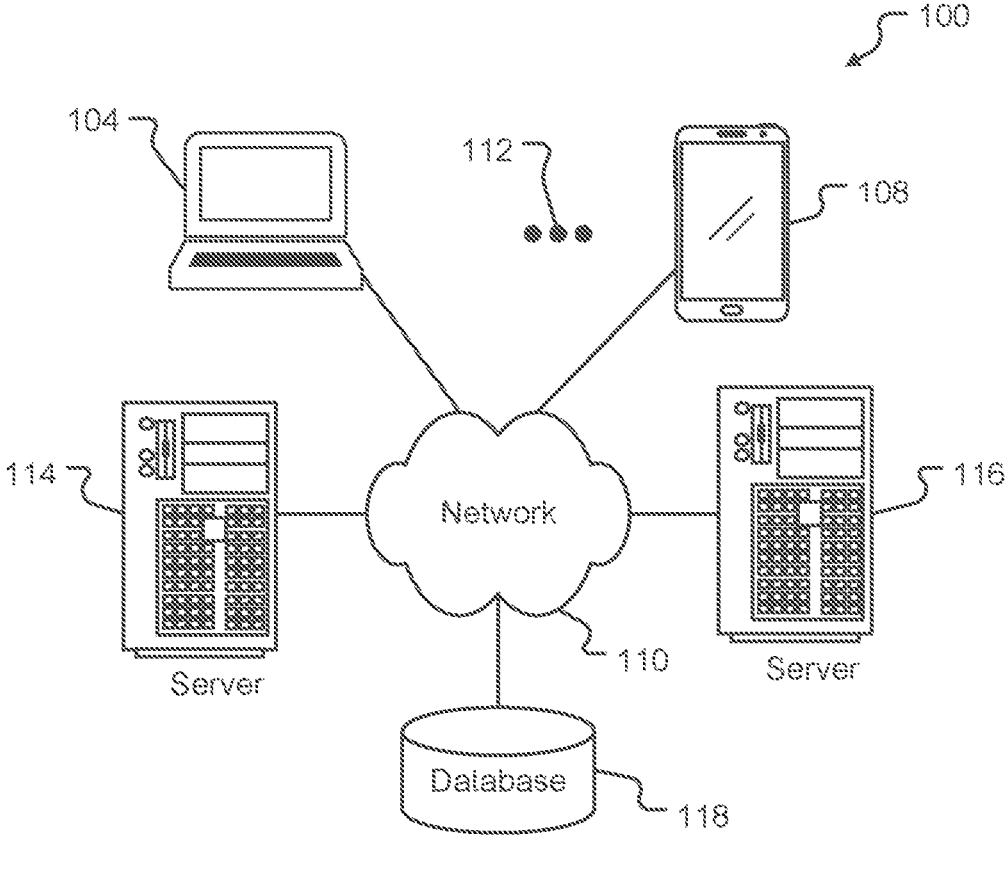
FIG. 1 is a block diagram illustrating elements of an example computing environment in which embodiments of the present disclosure may be implemented.

FIG. 1 is a block diagram illustrating elements of an example computing environment 100 in which embodiments of the present disclosure may be implemented. More specifically, this example illustrates a computing environment 100 that may function as the servers, user computers, or other systems provided and described herein. The environment 100 includes one or more user computers, or computing devices, such as a computer 104, a communication device 108, and/or more devices 112. The devices 104, 108, 112 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These devices 104, 108, 112 may also have any of a variety of applications, including, for example, database client and/or server applications and web browser applications. Alternatively, the devices 104, 108, 112 may be any other electronic device, such as a thin-client computer, an Internet-enabled mobile telephone, and/or a personal digital assistant, capable of communicating via a network 110 and/or playing audio, displaying images, etc. Although the example computer environment 100 is shown with two devices, any number of user computers or computing devices may be supported.

Environment 100 further includes a network 110. The network 110 may be any type of network familiar to those skilled in the art that can support data communications using any of a variety of commercially-available protocols, including without limitation Session Initiation Protocol (SIP), Transmission Control Protocol/Internet Protocol (TCP/IP), Systems Network Architecture (SNA), Internetwork Packet Exchange (IPX), AppleTalk, and the like. Merely by way of example, the network 110 maybe a Local Area Network (LAN), such as an Ethernet network, a Token-Ring network and/or the like; a wide-area network; a virtual network, including without limitation a Virtual Private Network (VPN); the Internet; an intranet; an extranet; a Public Switched Telephone Network (PSTN); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 114, 116. For example, the servers 114 and 116 may comprise build servers, which may be used to test webpage layout on various screen sizes via the devices 104, 108, 112. The servers 114 and 116 can run an operating system, including any of those discussed above, as well as any commercially available server operating systems. The servers 114 and 116 may also include one or more file and/or application servers, which can, in addition to an operating system, include one or more applications accessible by a client running on one or more of the devices 104, 108, 112. The server(s) 114 and/or 116 may be one or more general purpose computers capable of executing programs or scripts in response to the computers 104, 108, 112. As one example, the servers 114 and 116 may execute one or more automated tests. The automated tests may be implemented as one or more scripts or programs written in any programming language, such as Java™, C, C#®, or C++, and/or any scripting language, such as Perl, Python, or Tool Command Language (TCL), as well as combinations of any programming/scripting languages. The server(s) 114 and 116 may also include database servers, including without limitation those commercially available from Oracle®, Microsoft®, Sybase®, IBM® and the like, which can process requests from database clients running on the devices 104, 108, 112.

The tests created and/or initiated by the devices 104, 108, 112 (including tests created by other devices not illustrated) are shared to the server 114 and/or 116, which then may test and/or deploy the websites/webpages. The server 114 and/or 116 may transfer the generated webpage layout and/or data related to the same to the devices 104, 108, 112. Although for ease of description, FIG. 1 illustrates two servers 114 and 116, those skilled in the art will recognize that the functions described with respect to servers 114, 116 may be performed by a single server and/or a plurality of specialized servers, depending on implementation-specific needs and parameters. The computer systems 104, 108, 112, and servers 114, 116 may function as the system, devices, or components described herein.

The environment 100 may also include a database 118. The database 118 may reside in a variety of locations. By way of example, database 118 may reside on a storage medium local to (and/or resident in) one or more of the computers/servers 104, 108, 112, 114, 116. Alternatively, it may be remote from any or all of the computers/servers 104, 108, 112, 114, 116, and in communication (e.g., via the network 110) with one or more of these. The database 118 may reside in a Storage-Area Network (SAN) familiar to those skilled in the art. Similarly, any necessary files for performing the functions attributed to the computers/servers 104, 108, 112, 114, 116 may be stored locally on the respective computer/server and/or remotely, as appropriate. The database 118 may be used to store webpage layout data (e.g., respective locations of a plurality of elements), alerts, etc.

Figure 2:
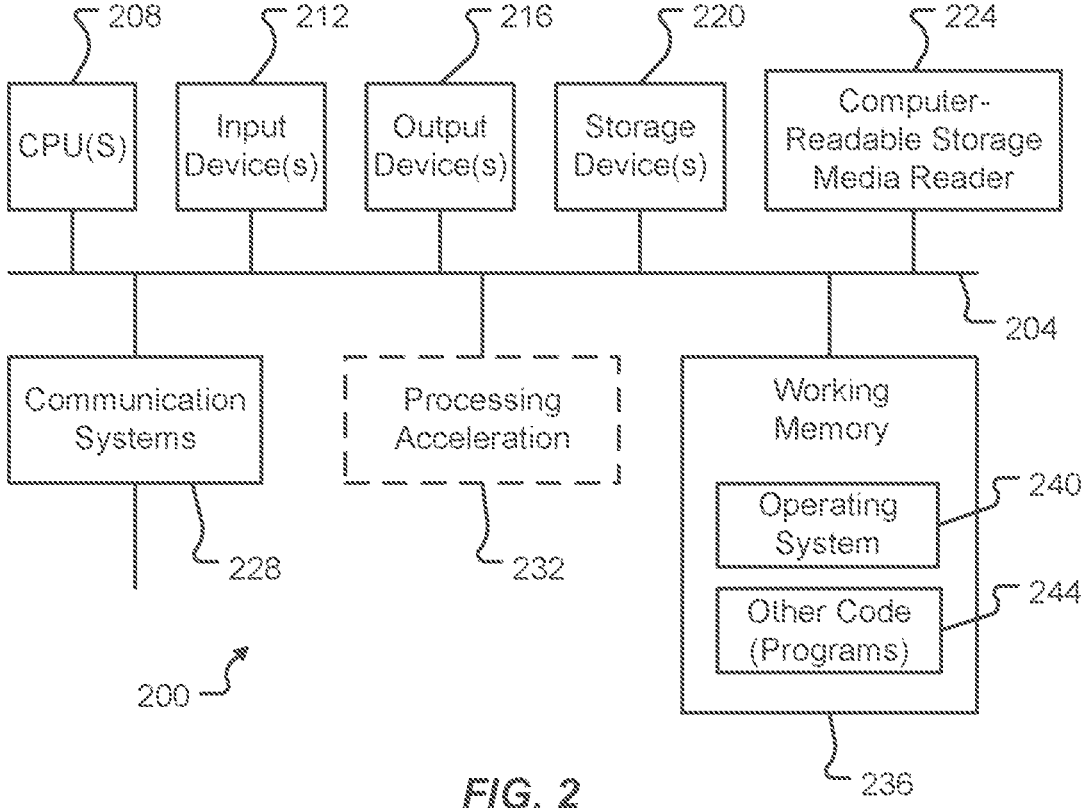
FIG. 2 is a block diagram illustrating elements of an example computing system in which embodiments of the present disclosure may be implemented.

FIG. 2 is a block diagram illustrating elements of an example computer system 200 in which embodiments of the present disclosure may be implemented. More specifically, this example illustrates one embodiment of a computer system 200 upon which the servers, computing devices, or other systems or components described above may be deployed or executed. The computer system 200 is shown comprising hardware elements that may be electrically coupled via a bus 204. The hardware elements may include one or more Central Processing Units (CPUs) 208; one or more input devices 212 (e.g., a mouse, a keyboard, etc.); and one or more output devices 216 (e.g., a display device, a printer, etc.). The computer system 200 may also include one or more storage devices 220. By way of example, storage device(s) 220 may be disk drives, optical storage devices, solid-state storage devices such as a Random-Access Memory (RAM) and/or a Read-Only Memory (ROM), which can be programmable, flash-updateable and/or the like.

The computer system 200 may additionally include a computer-readable storage media reader 224; communication systems 228 (e.g., a modem, a network card (wireless or wired), an infra-red communication device, etc.); and working memory 236, which may include RAM and ROM devices as described above. The computer system 200 may also include a processing acceleration unit 232, which can include a Digital Signal Processor (DSP), a special-purpose processor, and/or the like.

The computer-readable storage media reader 224 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communication systems 228 may permit data to be exchanged with a network and/or any other computer described above with respect to the computer environments described herein. Moreover, as disclosed herein, the term "storage medium" may represent one or more devices for storing data, including ROM, RAM, magnetic RAM, core memory, magnetic disk storage mediums, optical storage mediums, flash memory devices, and/or other machine-readable mediums for storing information.

The computer system 200 may also comprise software elements, shown as being currently located within a working memory 236, including an operating system 240 and/or other code 244. It should be appreciated that alternate embodiments of a computer system 200 may have numerous variations from that described above. For example, customized hardware might also be used and/or particular elements might be implemented in hardware, software (including portable software, such as applets), or both. Further, connection to other computers such as network input/output devices may be employed.

Examples of the CPUs 208 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 3A:
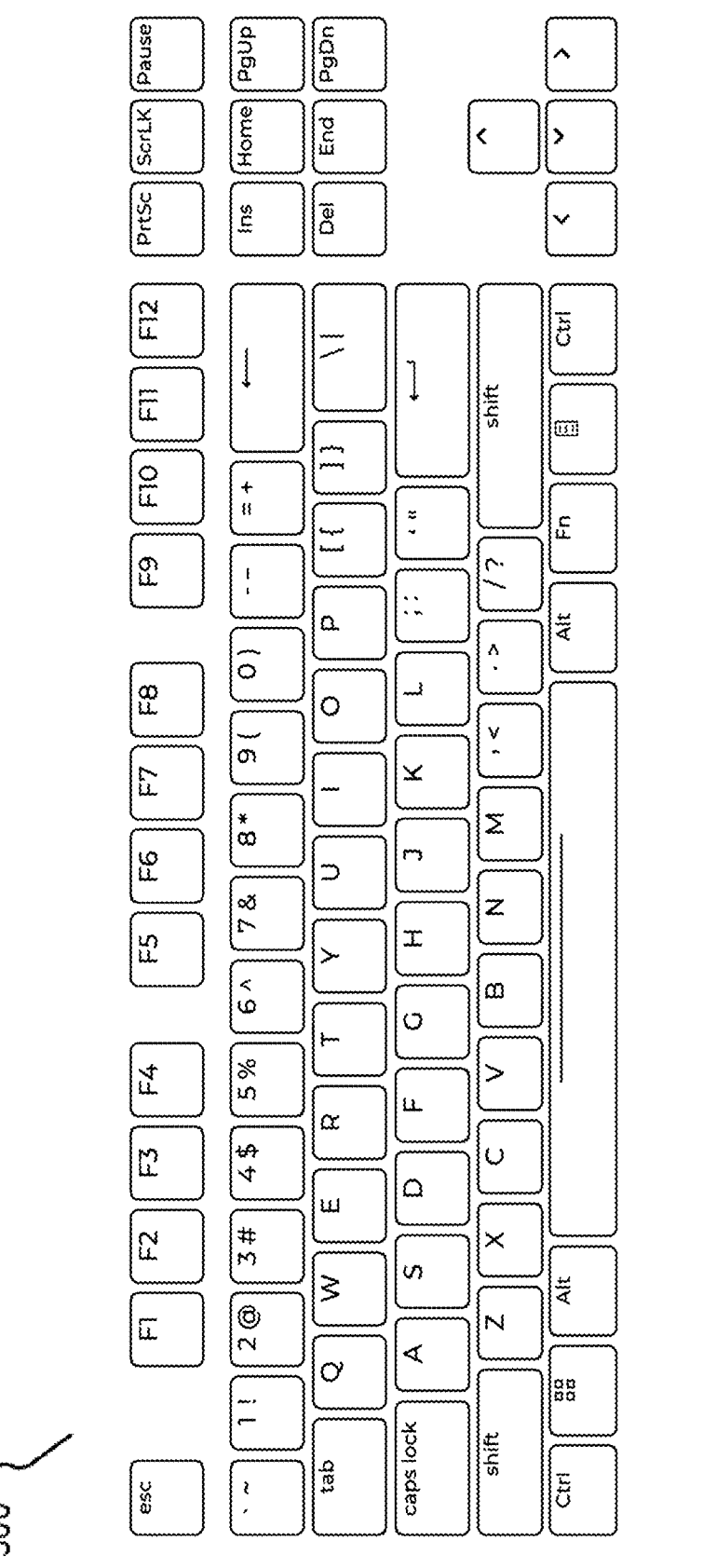
FIG. 3A illustrates an English-language QWERTY keyboard layout used in the examples described herein according to one embodiment of the present disclosure.

FIG. 3A illustrates an English-language QWERTY keyboard layout 300 used in the examples described herein.

However, it is understood the present disclosure may apply to keyboards with different layouts and/or in different languages.

Figure 3B:
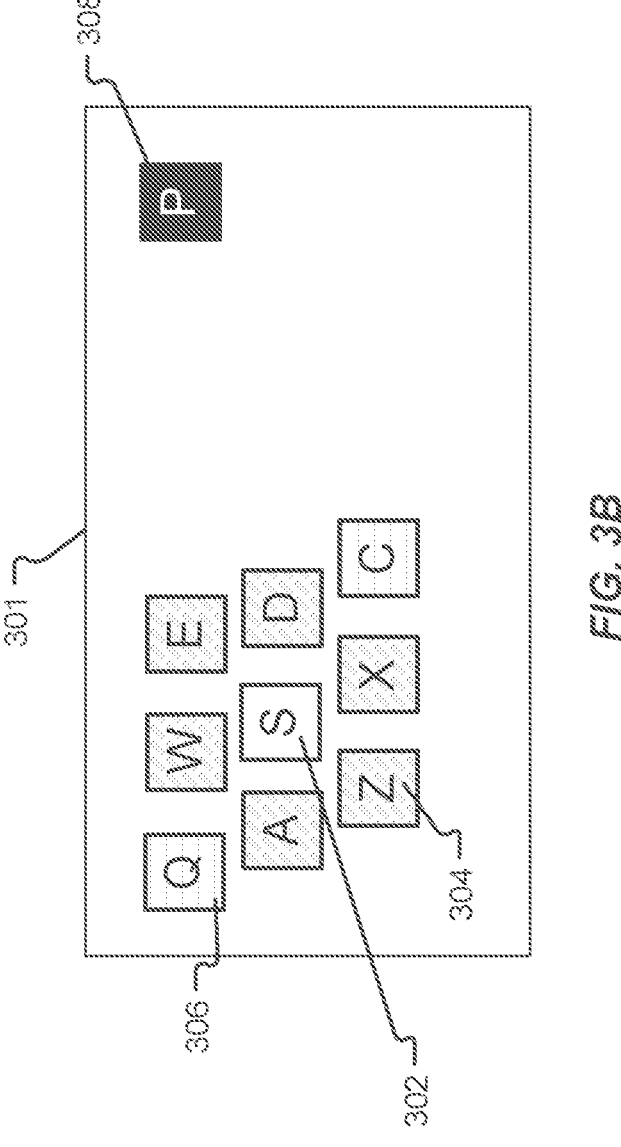
FIGS. 3B-3C are diagrams illustrating the distance between various keys according to one embodiment of the present disclosure.
Figure 3C:
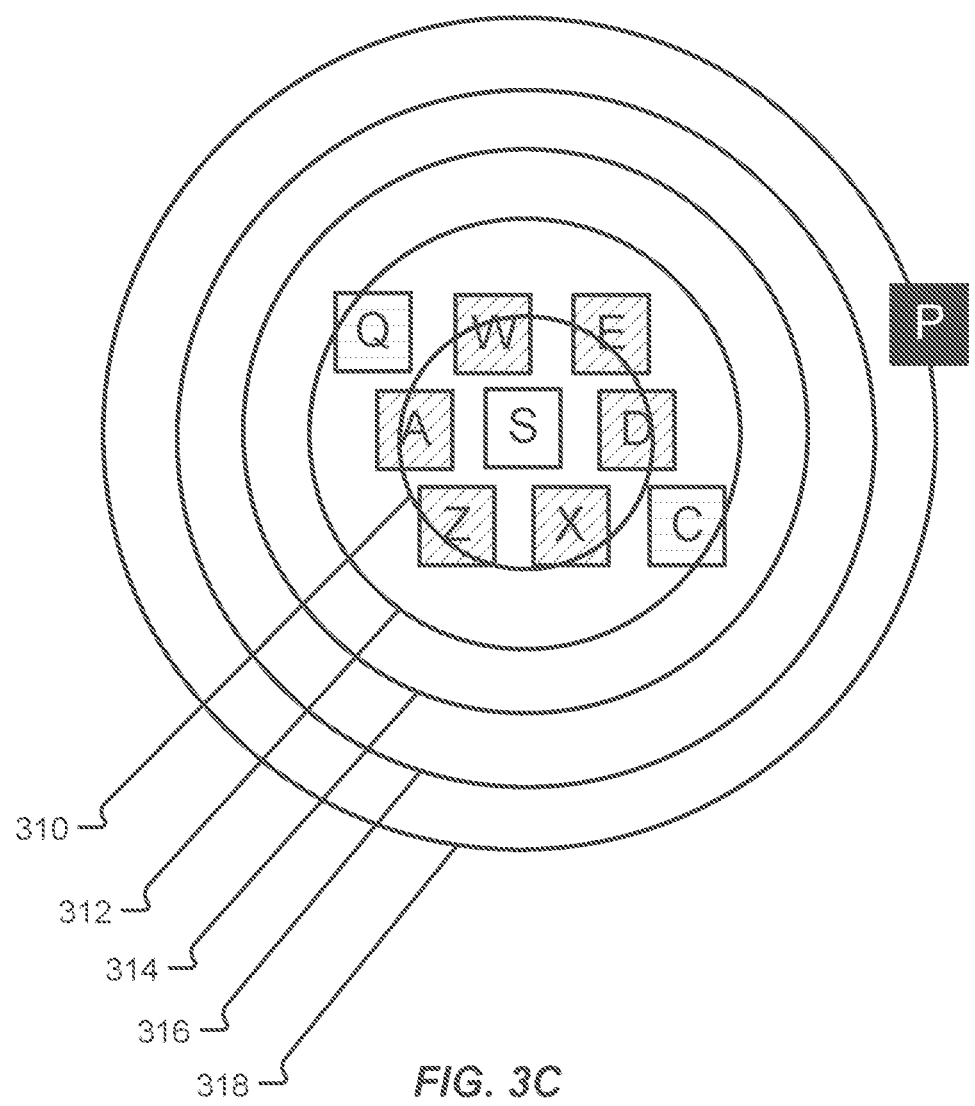

FIGS. 3B-3C are diagrams illustrating the distance between various keys. The distance between keys may be used to determine a delay between each character of an input string.

The present disclosure uses the distance between input keys to determine a delay between inputs to mimic a human typing. Distance is relative to which input was entered last. For example, the keys "S" and "P" are further apart than "S" and "D." In other words, although "S" and "P" are far apart, "P" is not far away from all keys (e.g., "P" and "O" are next to each other). Referring to FIG. 3B, which illustrates a portion 301 of the English-language QWERTY keyboard layout 300. In FIG. 3B, 302 represents the last input, so 302 is the starting point to measure the distance to next input. Keys 304 (with the diagonal lines) are within one concentric circle of 302. Keys 306 (with the horizontal lines) are two concentric circles from 302. Key 308 (black fill) is more than two concentric circles from 302. Using concentric circles as the basis for relative distance determination, with each additional concentric circle between keys, the interval between key inputs may increase by 0.1 ms (e.g., keys within one circle "sa" have a delay of 0.1 ms; keys separated by two circles "sq" have a delay of 0.2 ms; and keys separated by five circles "sp" have a delay of 0.5 ms).

As shown in FIG. 3C, the "S" serves as the center, the blocks with diagonal lines represent keys separated by one circle (i.e., 310), the blocks with horizontal lines represent keys separated by two circles (i.e., 312), and the black block represent keys separated by five circles (i.e., 318). Using concentric circles 310, 312, 314, 316, and 318 as the basis for relative distance determination, with each additional concentric circle between keys, the interval between key inputs may increase by 0.1 ms (e.g., keys within one circle "sa" have a delay of 0.1 ms; keys separated by two circles "sq" have a delay of 0.2 ms; and keys separated by five circles "sp" have a delay of 0.5 ms). In other words, the distance between keys may be used to determine a respective delay between each character. Although five concentric circles are illustrated, it is understood that more or fewer concentric circles may be used. For example, a delay may be calculated between keyboard and mouse inputs and/or between consecutive mouse inputs. Additionally, other methods of measuring relative distances may be used.

Figure 4A:
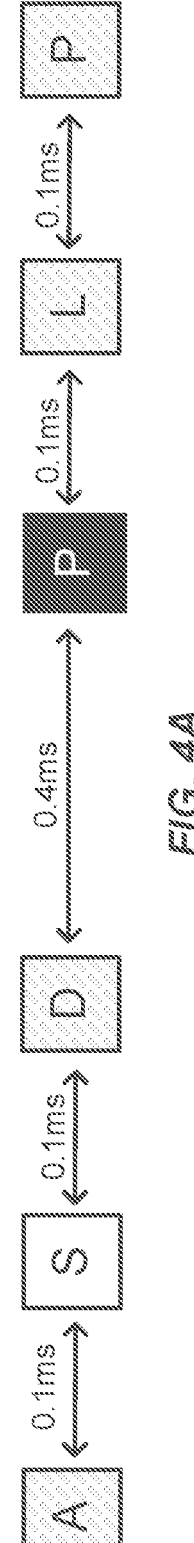
FIGS. 4A-4C are diagrams illustrating examples of delays between each character of an input string according to one embodiment of the present disclosure.
Figure 4B:
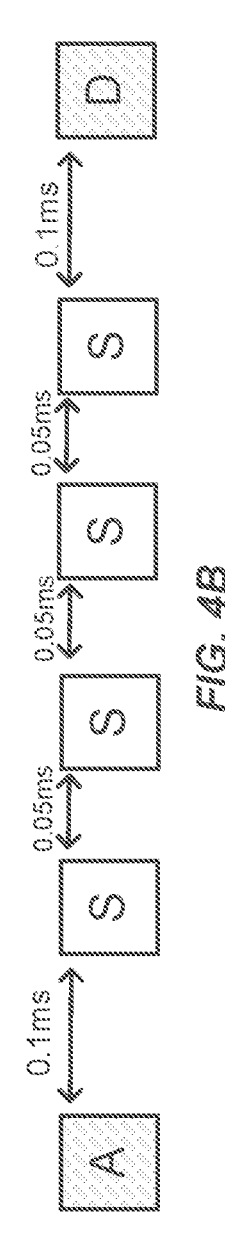
Figure 4C:
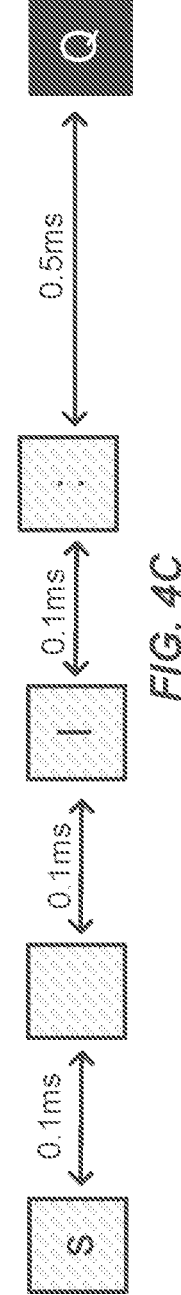

FIGS. 4A-4C are diagrams illustrating examples of delays between each character of an input string according to one embodiment of the present disclosure.

Referring to FIG. 4A, using the relative position of each key, the timing of the input may be controlled. For example, to enter "as," there is a delay of 0.1 ms between the "a" and the "s." Similarly, there is a delay of 0.1 ms between the "s" and the "d." The next character "p" is further away, so there may be a 0.4 ms delay between the "d" and the "p." The "p" and the "1" are closer together than the "d" and "p," so there is only a 0.1 ms. delay between entering "1" and "p."

Referring to FIG. 4B, to enter "assssd," there is a delay of 0.1 ms between the "a" and the first "s," and a delay of 0.05 ms between each subsequent "s," "s," and "s," and a delay of 0.1 ms between the fourth "s" and the "d."

Referring to FIG. 4C, to enter "s," ",", "1," ":," and "q," there is a delay of 0.1 ms between each of the first four characters, and a 0.5 ms delay between the fourth and fifth characters.

Figure 5:
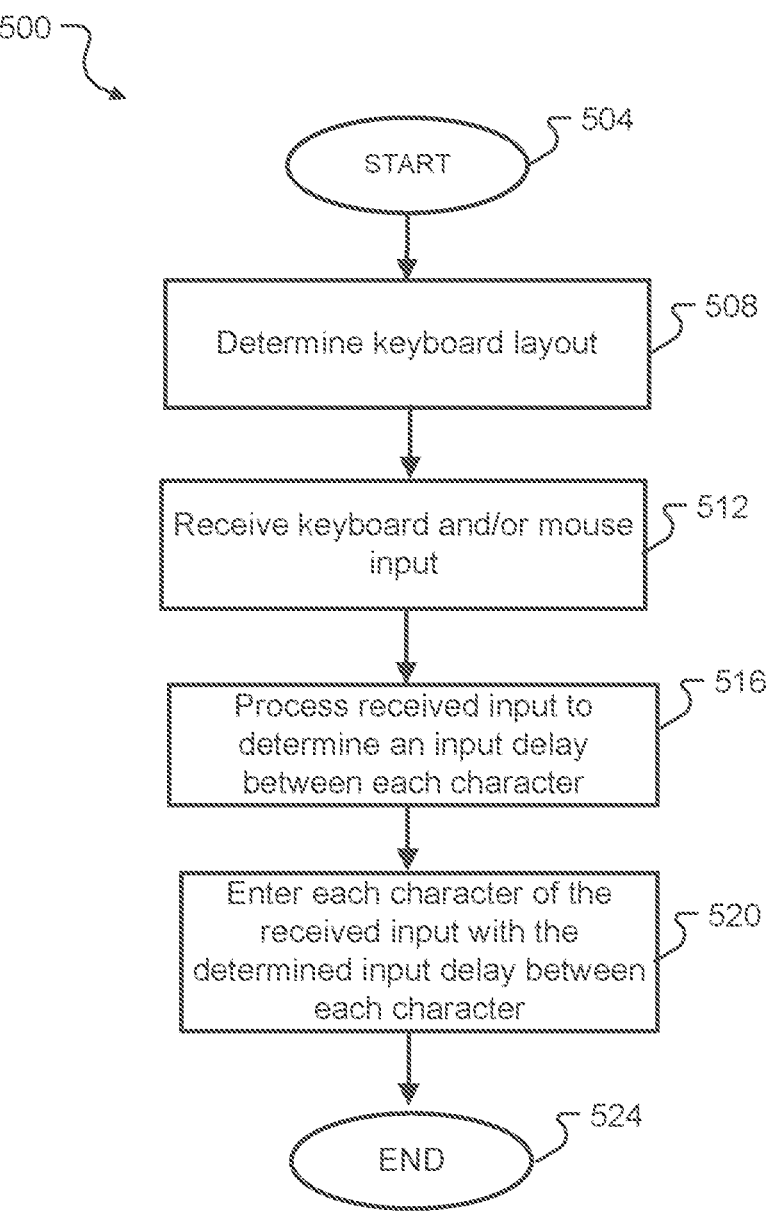
FIG. 5 is a flowchart illustrating an example process for improving keyboard input in automated testing according to one embodiment of the present disclosure.

FIG. 5 is a flow diagram of a process 500 for improving character input in an automated test environment. As one of skill in the art would recognize, there may be various ways to implement a process to improve character input in the automated test environment.

While a general order for the steps of the process 500 for the operation of improving character input in an automated test environment is shown in FIG. 5, the process 500 can include more or fewer steps or can arrange the order of the steps differently than those shown in FIG. 5. Further, two or more steps may be combined into one step. Generally, the process 500 starts with a START operation 504 and ends with an END operation 524.

In step 508, a keyboard layout is determined. Keyboard layout may describe the placement of keys/characters, as well as the language of the keyboard. For example, the keyboard layout may comprise an English-language QWERTY keyboard as illustrated in FIG. 3A. In other embodiments, the keyboard layout may be a keyboard in a language other than English (e.g., Chinese, Arabic, etc.). In embodiments, a location may also be determined, and the determined location may be used to determine the keyboard layout. For example, if the determined location is Shanghai, China, the keyboard layout may be a Chinese-language keyboard.

In step 512, a keyboard and/or mouse input comprising a plurality of characters is received. For example, the user enters a first input string for a username (e.g., "lamb.zhou@abc123.com") and a second input string for a password associated with the username (e.g., "secretpassword") as part of an authentication operation.

In step 516, the received input is processed to determine an input delay between each character of the plurality of characters. For example, the input string (e.g., the username) "lamb.zhou@abc123.com" is processed to determine a delay between each of the characters of the input string. Step 516 may be repeated for the second input string (e.g., the password). "secretpassword."

In step 520, each character of the received input "lamb.zhou@abc123.com" is entered with the determined input delay between each character. The relative position of the keys are used to control the timing of the input (e.g., determine a delay between each input character), there may be a pause of 0.1 ms between two of the entered characters that are close together and a longer delay (e.g., 0.5 ms) between characters that are further apart. The same process is followed for the entire input (e.g., the username and password), i.e., there is a delay between each character. "lamb.zhou@abc123.com." In other words, there is a delay between "1" and "a," "a" and "m," "m" and "b," "b" and "." etc.

Figure 6:
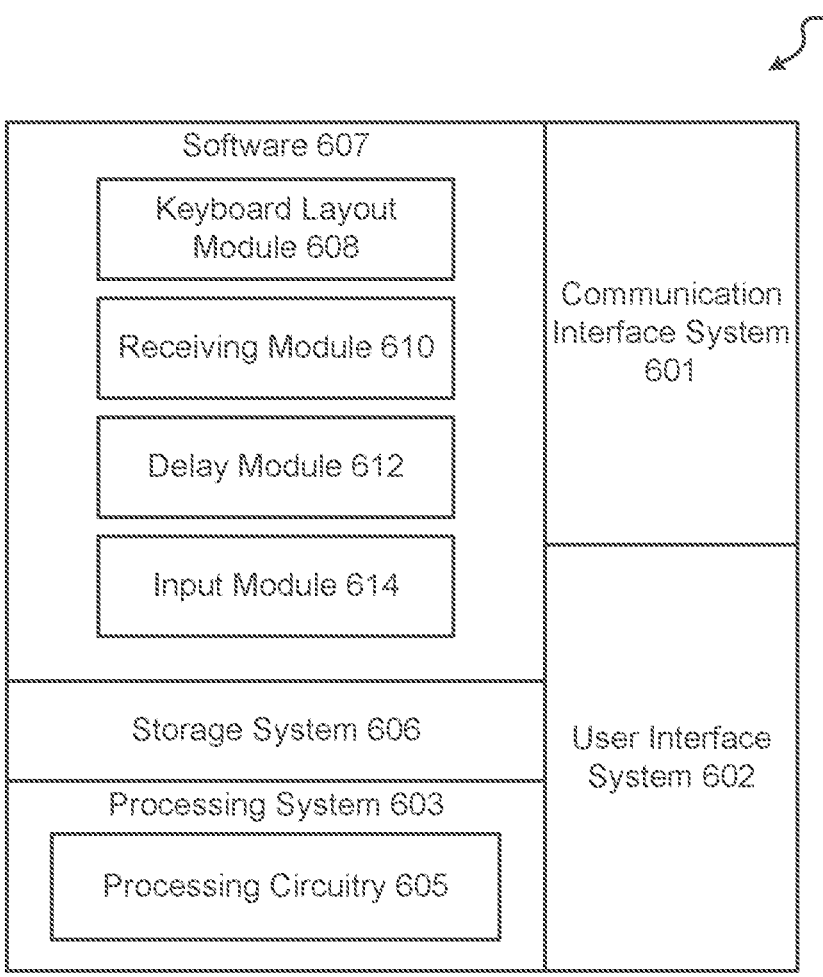
FIG. 6 is a block diagram illustrating an example computing device for improving keyboard input in automated testing according to one embodiment of the present disclosure.

FIG. 6 depicts a computing device 600 in accordance with embodiments of the present disclosure. The computing device 600 performs the automatic testing of the layout of a webpage in accordance with the embodiments disclosed herein. The computing device 600 receives supported screen size data for a webpage. For example, the computing device 600 may retrieve the screen size data from supported screen size data included in a Cascading Style Sheets (CSS) meta query. The computing device 600 may store the screen size data and webpage layout data in storage system 606 and display/play an alert via the user interface system 602 (e.g., a display and/or a speaker or headphones connected to computing device 600). Similar computing systems may be included in devices 104, 108, and 112, in whole or in part, as described herein to perform the automatic testing of a webpage layout.

A computing device 600 is representative of any computing system or systems with which the various operational architectures, processes, scenarios, and sequences disclosed herein perform the automatic testing of a layout of a webpage on different screen sizes comprising various components and connections to other components and/or systems.

The computing device 600 comprises a communication interface system 601, a user interface system 602, and a processing system 603. The processing system 603 is linked to the communication interface 601 and user interface system 602. The processing system 603 includes a microprocessor and/or processing circuitry 605 and a storage system 606 that stores operating software 607. The computing device 600 may include other well-known components such as a battery and enclosure that are not shown for clarity. The computing device 600 may comprise a server, a user device, a desktop computer, a laptop computer, a tablet computing device, or some other user communication apparatus.

The communication interface 601 comprises components that communicate over communication links, such as network cards, ports, radio frequency (RF), processing circuitry and software, or some other communication device. Communication interface 601 may be configured to communicate over metallic, wireless, or optical links. Communication interface 601 may be configured to use Time Division Multiplex (TDM), Internet Protocol (IP), Ethernet, optical networking, wireless protocols, communication signaling, or some other communication format, including combinations thereof. In some implementations, the communication interface 601 is configured to communicate with other devices, wherein the communication interface 601 is used to retrieve screen size and webpage layout data.

The user interface system 602 comprises components that interact with a user to display a rendered webpage and/or alerts and receive input from the user. The user interface system 602 may include a speaker, microphone, buttons, lights, display screen, touch screen, touch pad, scroll wheel, communication port, or some other user input/output apparatus, including combinations thereof.

The processing circuitry 605 may be embodied as a single electronic microprocessor or multiprocessor device (e.g., multicore) having therein components such as control unit(s), input/output unit(s), arithmetic logic unit(s), register(s), primary memory, and/or other components that access information (e.g., data, instructions, etc.). The processing circuitry 605 may receive instructions (e.g., via a bus), executes the instructions, and outputs data (e.g., via the bus). In other embodiments, the processing circuitry 605 may comprise a shared processing device that may be utilized by other processes and/or process owners, such as in a processing array or distributed processing system (e.g., "cloud," farm, etc.). It should be appreciated that the processing circuitry 605 is a non-transitory computing device (e.g., an electronic machine comprising circuitry and connections to communicate with other components and devices). The processing circuitry 605 may operate a virtual processor, such as to process machine instructions not native to the processor (e.g., translate the Intel® 9xx chipset code to emulate a different processor's chipset or a non-native operating system, such as a VAX operating system on a Mac). However, such virtual processors are applications executed by the underlying processor and the hardware and other circuitry thereof.

The processing circuitry 605 comprises a microprocessor and other circuitry that retrieves and executes the operating software 607 from the storage system 606. The storage system 606 may include volatile and nonvolatile and removable and non-removable media implemented in any method or technology for storage of information, such as computer readable instructions, data structures, program modules, or other data. The storage system 606 may be implemented as a single storage device, but may also be implemented across multiple storage devices or sub-systems. The storage system 606 may comprise additional elements, such as a controller to read the operating software 607. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

The processing circuitry 605 is typically mounted on a circuit board that may also hold the storage system 606 and portions of the communication interface 601 and the user interface system 602. The operating software 607 comprises computer programs, firmware, or some other form of machine-readable program instructions. The operating software 607 includes keyboard layout module 608, receiving module 610, delay module 612, and input module 614, although any number of software modules within the application may provide the same operation. The operating software 607 may further include an operating system, utilities, drivers, network interfaces, applications, or some other type of software. When executed by the processing circuitry 605, the operating software 607 directs the processing system 603 to operate the computing device 600 as described herein.

In at least one implementation, the keyboard layout module 608, when read and executed by the processing system 603, directs the processing system 603 to determine a keyboard layout. The receiving module 610, when read and executed by the processing system 603, directs the processing system 603 to receive an input string, wherein the input comprises a plurality of characters. Delay module 612, when read and executed by the processing system 603, directs the processing system 603 to process the input string to determine an input delay between each character of the input string. The input module 614, when read and executed by the processing system 603, directs the processing system 603 to enter each character of the input string with the determined input delay between each character.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, sub-combinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method to improve keyboard input in automated testing, the method comprising:
   determining a keyboard layout for a keyboard hardware input device usable by a human user for character-by-character typing of a string of a plurality of characters;
   receiving the string as an input via a copy (ctrl+c) and paste (ctrl+v) operation that results in a simultaneous input of an entirety of the string;
   processing each character of the string, wherein the processing comprises determining an input delay to be added between each character of the string based on a distance between each key associated with each character of the string; and
   during the automated testing, entering each character of the string non-simultaneously with the input delay added between each character of the string to mimic the character-by-character typing of each character of the plurality of characters of the string by the human user using the keyboard hardware input device.

2. The method of claim 1, wherein the distance between each key of the determined keyboard layout is measured using concentric circles.

3. The method of claim 2, wherein each concentric circle that is between a key and a next key adds additional time to the input delay between those keys.

4. The method of claim 1, wherein determining the keyboard layout comprises determining a location of a keyboard and selecting a layout based on the determined location of the keyboard.

5. The method of claim 1, further comprising selecting an input model for determining the input delay based on the determined keyboard layout.

6. The method of claim 1, wherein determining the input delay to be added between each character of the plurality of characters of the string comprises applying a keyboard model anthropomorphic algorithm.

7. The method of claim 1, wherein the automated testing further comprises Unified Functional Testing Device Replay.

8. The method of claim 1, wherein the entering comprises simulating the character-by-character typing of the string by the human user by artificially adding the determined input delay between of each character of the plurality of characters of the string.

9. The method of claim 1, wherein the input delay provides for simulating the input received via the ctrl+c and paste ctrl+v operation as the simultaneous input of the entirety of the string as instead receiving each character of the plurality of characters of the string via the character-by-character typing by the human user.

10. A system, comprising:

a keyboard;

a processor; and a memory coupled with and readable by the processor and storing therein a set of instructions which, when executed by the processor, cause the processor to improve keyboard input in automated testing by:

determining a keyboard layout for a keyboard hardware input device usable by a human user for character-by-character typing of a string of a plurality of characters;

receiving the string as an input via a copy (ctrl+c) and paste (ctrl+v) operation that results in a simultaneous input of an entirety of the string;

processing each character of the string, wherein the processing comprises determining an input delay to be added between each character of the string based on a distance between each key associated with each character of the string; and during the automated testing comprising a device-level replay simulating the character-by-character typing of the string by the human user, entering each character of the plurality of characters of the string non-simultaneously with the input delay added between each character.

11. The system of claim 10, wherein the distance between each key of the determined keyboard layout is measured using concentric circles.

12. The system of claim 11, wherein each concentric circle that is between a key and a next key adds additional time to the input delay between those keys.

13. The system of claim 10, wherein determining the keyboard layout comprises determining a location of the keyboard and selecting a layout based on the determined location of the keyboard.

14. The system of claim 10, wherein when executed by the processor, the set of instructions further cause the processor to improve keyboard input in automated testing by selecting an input model for determining the input delay based on the determined keyboard layout.

15. A tangible non-transitory computer readable storage medium comprising instructions that when executed cause a machine to:

determine a keyboard layout for a keyboard hardware input device usable by a human user for keystroke-by-keystroke entry of a string of a plurality of characters;

receive the string as an input via a copy (ctrl+c) and paste (ctrl+v) operation that results in a simultaneous input of an entirety of the string;

process each character of the string, wherein when executed to process each character is the string, the instructions cause the machine to determine, based on a distance between each key associated with each character of the string, an input delay to be added between each character of the string; and during automated testing, enter each character of the plurality of characters of the string with the input delay added between each character to mimic a manual character-by-character entry each character of the plurality of characters of the string by way of the keyboard hardware input device.

16. The tangible non-transitory computer readable storage medium of claim 15, wherein the distance between each key of the determined keyboard layout is measured using concentric circles.

17. The tangible non-transitory computer readable storage medium of claim 16, wherein each concentric circle that is between a key and a next key adds additional time to the input delay between those keys.

18. The tangible non-transitory computer readable storage medium of claim 15, wherein when executed to determine the keyboard layout, the instructions cause the machine to determine a location of a keyboard and select a layout based on the determined location of the keyboard.

19. The tangible non-transitory computer readable storage medium of claim 15, wherein when executed, the instructions further cause the machine to select an input model for the determination of the input delay.

20. The tangible non-transitory computer readable storage medium of claim 19, wherein when executed to select the input model, the instructions cause the machine to select the input model based on the determined keyboard layout.

\* \* \* \* \*